Nov. 16, 1971  C. R. OLSEN  3,620,121
RADIAL ACTUATOR AND RELEASE MECHANISM
Filed April 15, 1969

Charles R. Olsen
INVENTOR.

United States Patent Office 3,620,121
Patented Nov. 16, 1971

3,620,121
RADIAL ACTUATOR AND RELEASE MECHANISM
Charles R. Olsen, 2020 Cypress St.,
Philadelphia, Pa. 19103
Filed Apr. 15, 1969, Ser. No. 816,272
Int. Cl. F16b 1/00
U.S. Cl. 89—1                                                5 Claims

ABSTRACT OF THE DISCLOSURE

A hollow tube or radial actuator containing an explosive charge, or a means of pressurizing the interior of the tube from an external source, is deformed by flattening, indenting, or fluting, so that the volume of the tube is substantially reduced. When the tube is pressurized by firing the explosive charge, or by an external pressure source, the tube inflates, and attempts to resume a cylindrical shape. In resuming a cylindrical shape, the tube transfers force to an external mechanism, and performs a useful function. In the application shown in this disclosure, the tube is situated within a split tubular retainer of a release mechanism which is indented to match the initial flutes, or deformation of the actuator. When the actuator resumes its cylindrical shape, the split tubular retainer is expanded releasing a pin, or device, which was held captive in the retainer.

BACKGROUND OF THE INVENTION

This invention relates to a means for producing radial motion, and more particularly to apparatus utilizing this radial motion for holding or releasing a device to be controlled. The device of the present invention has a relatively large scope of application. The invention, therefore, should not be limited to the specific uses disclosed herein. The invention has been found to possess exceptional utility as an explosive actuator. However, the invention will operate satisfactorily by the use of any fluid under pressure. The fluid under pressure may be supplied either by an explosive charge or squib, or by suitable means other than an explosive charge. For example, a hydraulic source may be employed. Further, a high pressure gas from a rocket motor, or external pressure supply may also be employed. In the past, explosive actuators have incorporated elongated accordion bellows type vessels, or have had the vessel end inverted in the form of a dimple. These actuators function in an axial direction by extending the bellows or bulging the dimple in the end. These actuators have several serious disadvantages. One is that the area against which the pressurizing fluid works is the right cross section of the cylinder, and is a small area for a given size actuator, thus limiting the total force available for reasonable fluid pressures.

Release mechanisms of the prior art have been primarily explosive bolts, or ball release mechanisms. Explosive bolts operate by an explosive charge fracturing the bolt body with hazards to personnel and contamination of adjacent areas by explosion products. An additional disadvantage of explosive bolts is that they provide an undesirable thrust. Ball release mechanisms generally utilize a linear actuator which moves a piston axially, aligning recesses in the piston with captivated steel balls, permitting the balls to move inward, releasing a retained sleeve. Ball release mechanisms are thrust free, and overcome the hazards of explosive bolts, however, they are complex and require precise alignment.

SUMMARY OF THE INVENTION

In accordance with the device of the present invention, the above described and other disadvantages of the prior art are overcome by providing an elongated tube having a non-circular cross section. A fluid under pressure is then introduced into the interior of the tube, causing it to deform to a circular cross section. The action of the tube in deforming to a circular cross section produces the desired radial motion for actuating devices.

Because the longitudinal cross section of the cylinder is greater than the circular cross section utilized in the prior art, a larger area is presented to the working fluid, resulting in an increased available force at a given fluid pressure. The thickness of a flattened tube is less than the length of the actuators of the prior art, permitting the actuator of the present invention to be utilized between two closely adjacent surfaces. The actuator and release mechanism of the present invention is also small, light, uncomplicated, and reliable.

These and other advantages of the present invention will be better understood from the following description, when considered in connection with the accompanying drawings.

BRIEF DESCRIPTION OF THE DRAWINGS

In the drawings, which are to be regarded as merely illustrative.

DESCRIPTION OF THE PREFERRED EMBODIMENTS

Figure 1:
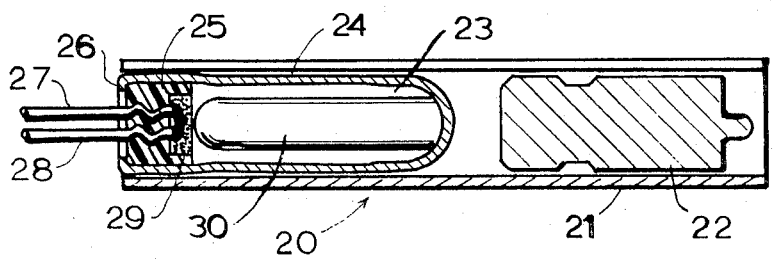
FIG. 1 is a longitudinal view, in section of one embodiment of the present invention.
Figure 2:
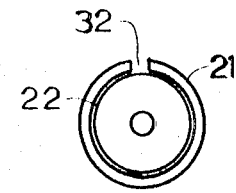
FIG. 2 is an end view of the embodiment shown in FIG. 1.
Figure 3:
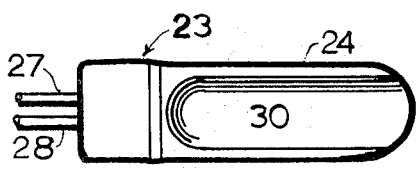
FIG. 3 is a longitudinal view of the actuator shown in the embodiment in FIG. 1.
Figure 4:
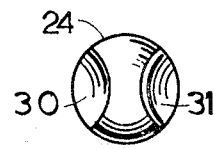
FIG. 4 is an end view of the actuator shown in FIG. 3.
Figure 6:
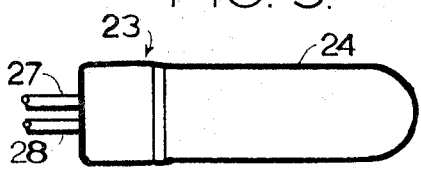
FIG. 6 is a longitudinal view similar to FIG. 3, showing the form of the actuator after it has been pressurized.
Figure 7:
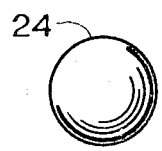
FIG. 7 is an end view similar to FIG. 4, showing the form of the actuator after it has been pressurized.
Figures 14A, 14B:
FIGS. 14a and 14b are end views of alternate radial actuators with deformed tubes similar to FIG. 4, but showing a flattened tube, FIG. 14a, and a single flute, or C shaped tube FIG. 14b, which may be employed in accordance with the present invention.

In the drawing in FIG. 1, a latch and release mechanism is indicated at 20. The mechanism 20 comprises an outer metallic or suitable non-metallic tubular retainer 21, an operating member or a pin 22, which is held in position by the tubular retainer 21, and the radial actuator 23, which is shown in section in FIG. 1. The radial actuator 23, consists of a tubular metallic or suitable non-metallic vessel 24, closed at one end, and plugged at the other end by a standard electric squib header 25, which is sealed in place at 26, and permits the lead wires 27 and 28 to conduct an electric impulse to fire the explosive mix 29. The tubular vessel 24, is indented or fluted with longitudinal flutes at 30 and 31. These longitudinal flutes reduce the internal volume of the actuator. The tubular vessel 24 is shown fabricated with a doomed end which permits indenting the longitudinal flutes all of the way to the end without the buckling which would occur on a flat end cylinder. FIGS. 3 and 4 show one suitable configuration for the external flutes 30 and 31. FIGS. 6 and 7 show the disappearance of the external flutes 30 and 31, as the device is pressurized and the tubular vessel 24 returned to its cylindrical form. The embodiment shown in FIG. 3 and FIG. 4 may be varied. Vessel 24 may be formed with a cross section as shown in FIG. 4, or as shown in FIGS. 14a and 14b, or it may be formed as a polygon with three, four, or more sides or it may have a star shaped cross section of three, four or more points.

Figure 5:
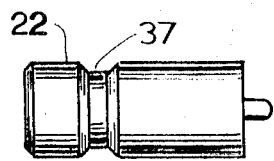
FIG. 5 is a longitudinal view of the pin which is retained in the embodiment, as shown in FIG. 1.
Figure 8:
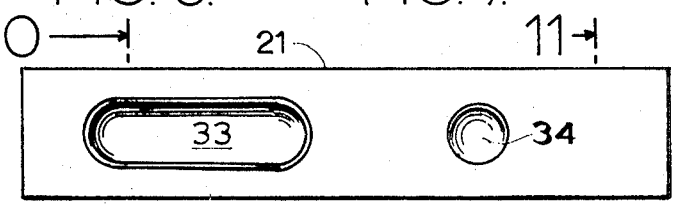
FIG. 8 is a longitudinal view of the split tubular retainer of the embodiment shown in FIG. 1.
Figure 9:
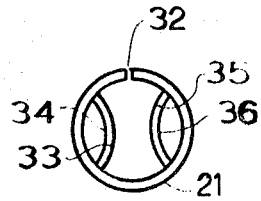
FIG. 9 is an end view of the retainer shown in FIG. 8.

FIG. 5 shows a detent groove 37 around pin 22. This groove 37 provides a locking detent arrangement when the pin 22 is in the split spring tubular retainer 21, and engages the opposing detents 34 and 36 shown in FIGS. 8 and 9. FIG. 8 shows both the elongated flute, or indentation 33, which matches the indentation 30 in the radial actuator 23, and shows the detent 34. FIG. 9 shows both the elongated flute 33, shown in FIG. 8, and the opposing mirror image flute 35 on the opposite side of the retainer 21. FIG. 9 also shows both the detent 34, and the opposing mirror image, detent 36 on the opposite side of the retainer 21. When the actuator 23 is pressurized, and the indentations 30 and 31 in the actuator 23 expand to resume a cylindrical form, pressure is applied to the flutes 33 and 35 in the retainer 21, causing the retainer to expand at its split portion 32. The expanded retainer 21, no longer locks the pin 22 in place by either friction, or by the use of optional detents 34 and 36 in the detent groove 37, thus releasing the pin 22.

Pin 22 as illustrated, is a firing pin in a fuze safety and arming application. For other applications, pin 22 can be a part of any device which must be held securely, and released on command. Examples of such devices are: cluster bombs, ballast, leaflets, chaff packages, expended rocket motor casings, decoys or warheads.

Figures 10, 11:
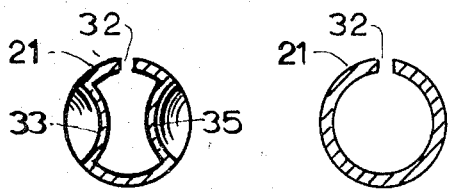
FIG. 10 is a transverse view in section, taken on the line 10—10 of the retainer shown in FIG. 8.
FIG. 11 is a transverse view shown in section, taken on the line 11—11 of the retainer shown in FIG. 8.

FIG. 9 shows the end view of the retainer 21, and shows how the retainer 21 in its free state assumes a smaller inside diameter than the diameter of the pin 22, closing down the gap, or slot 32 thus providing spring tension to securely grip the pin 22, even without the aid of the detents 34 and 36, and detent groove 37. FIG. 10 shows the sectional view of the retainer shown in FIG. 8 along the plane 10—10, as the retainer would be in the pre-actuated position. After firing the actuator 23, the retainer 21, is expanded to a larger diameter, widening the slot 32, and removing the spring tension which was holding the pin 22. The actuator 23 has expanded sufficiently so that the detents 34 and 36 no longer engage in the detent groove 37, so that the pin 22 is now free, and no longer held captive.

The radial actuator and release mechanism 20 of the present invention operates as follows. As long as the radial actuator 23 remains in its unfired or fluted condition, as shown in FIG. 4, the tubular retainer 21 grips the pin 22 securely through frictional force, and in addition the detents 34 and 36 protrude inwardly into the detent groove 37, providing a positive lock. The detents 34 and 36 and the detent grooves 37 are meerly illustrative. The detents may be omitted entirely in which case the friciton between pin 22 and retainer 21 will lock pin 22. The pin 22 and retainer 21 may have matching sets of threads or may be arranged solely to prevent rotational motion between pin 22 and retainer 21 until actuated.

The retainer may be split as shown at 32, or the split may be omitted and the force of the actuator 23 be utilized to expand the retainer 21 along a suitably weakened path such as a longitudinal groove, or notch.

Figure 12:
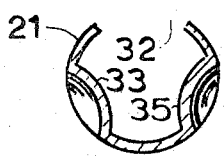
FIG. 12 is a transverse sectional view similar to FIG. 10, showing the expansion of the retainer after it has been actuated.
Figure 13:
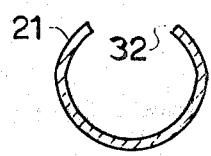
FIG. 13 is a transverse sectional view, similar to FIG. 11, showing the expansion of the retainer after it has been actuated.

When it is desired to actuate the radial actuator and release mechanism 20, the explosive charge 29 of the squib header 26 is fired by an electrical impulse through leads 27 and 28, or by suitable percussion means. The explosion inside the vessel 24 pressurizes the vessel 24 and causes the vessel 24 to expand to a cylindrical cross section, as shown in FIG. 7, displacing the flutes 30 and 31 in a radial direction. The radial displacement of the flutes 30 and 31 can be utilized to actuate a variety of devices, such as switches, door release, door sealing, and valve actuation mechanisms, in addition to the release mechanism 20, shown in FIG. 1. When the expanding flutes 30 and 31 of actuator 23 press against the flutes 33 and 35 in the retainer, the force is transmitted to the retainer 21, causing it to expand to the form shown n FIGS. 12 and 13 thereby releasing the pin 22, which then becomes free to move under external force in an axial or rotational direciton.

The squib end of the retainer 21 may be restrained from expanding by an external support thus causing maximum expansion to occur at the end retaining the pin 22.

The radial actuator 23 can if desired, be made as a long slender vessel. This form of the device of the invention is particularly advantageous where a relatively long and slender storage space is available, or if that is not the case, the long slender device can be bent to suit the available space by utilizing conventional tube bending means. The squib or explosive 29 may also be located adjacent or relatively remotely of that depicted in the drawings and the explosive material may, alternatively, be in an integral mass at one particular location or distributed as a relatively thin layer along the side of the tube. A satisfactory explosive charge for use with this invention can vary from a very slow burning propellant to a relatively high explosive material such as the material known in the art as Mild Detonating Fuse.

All embodiments of the invention may be disposable.

From the earlier description of the prior art explosive actuators, it will be understood that the prior art explosive actuators involve the use of an extensible bellows, or a dimple in the end of the cylinder. Both devices, when actuated, provide an extension in an axial direction. These actuators for a given diameter and operating pressure are limited in force by the internal right cross sectional area of the cylinder against which the pressure may work. Note will be taken that the actuator of the present invention for a comparable diameter device provides a much larger area upon which the pressure can work. The area in this case being the longitudinal cross section of the cylindrical vessel.

From the earlier description of the prior art of release mechanisms, it will be understood that the explosive bolt type of release mechanism has accompanying contamination, personnel hazard, and thrust disadvantages. Note will be taken that the release mechanism of the present invention introduces no contamination from gas, or metallic particles, since the pressure vessel remains sealed throughout the entire operation, and that there is no personnel hazard involved, since the retainer only expands without fragmenting and that no undesirable thrust is imparted to the pin 22 when it is released. From the earlier description of the prior art of a ball release mechanism, it will be understood that ball release mechanisms which involve the linear motion of a pressure actuated piston to align a groove with hardened steel balls require the use of a linear actuator accompanied by sliding seals which require precision surface finished materials to prevent the escape of contamination, and to provide a reliable low friction operation. These devices require precision alignment with the parts to be released, so that the load is distributed evenly to prevent binding of the balls, or deformation of the ball seat surfaces. The explosive release mechanism of the present invention operates very efficiently. There is no alignment problem, since the spring retainer 21 is flexible enough to accommodate considerable misalignment. The device is also economical to manufacture with a minimum of close tolerances. Surface finishes of this device are not critical, and finishes produced by ordinary stamping, or drawing processes are quite satisfactory.

The word fluid is normally defined to include either a liquid, or a gas. Thus, for use in this specification and claims, the word fluid is hereby defined to include, but not to be limited, to a liquid, or a cold or hot gas, including the products of explosion of conventional pyrotechnic materials.

Although only a few embodiments of the present invention have been described and illustrated herein, many illustrations and modifications thereof will suggest themselves to those skilled in the art. The present invention should therefore, not be limited to the embodiments selected for this disclosure, the true scope of the invention being defined only in the appended claims.

What is claimed is:

1. A pressure operated device comprising a sealed tubular pressure vessel including a longitudinally extending side wall of a predetermined length surrounding an internal chamber formed within the pressure vessel, means for pressurizing the chamber of the pressure vessel and including a selectively actuatable fluid pressure generating device, the pressure vessel being expandable in a radial direction upon actuation of the pressure generating device to deform the side wall of the pressure vessel into a generally circular uninterrupted cross section of increased diameter while the predetermined length of its side wall remains substantially unchanged, a deformable, generally tubular retainer having a diameter greater than that of the tubular pressure vessel prior to its being expanded, and an operating member, the pressure vessel and the operating member being received in the tubular retainer and releasably retained thereby against movement in adjacent longitudinally aligned coaxial relation to the retainer, the pressure vessel, upon being radially expanded, assuming said increased diameter which is sufficiently greater than that of the retainer to cause it to radially expand and release the operating member for movement relative to the tubular retainer.

2. The device of claim 1 wherein the side wall of the sealed tubular pressure vessel is longitudinally iindented and partially collapsed such that upon being expanded to its generally circular cross section, the circumferential size of the pressure vessel is substantially amplified in a radial direction while yet maintaining the integrity of the sealed chamber within the pressure vessel upon actuation of the pressure generating device.

3. The device of claim 1 wherein one end of the pressure vessel has a domed arcuate configuration, and wherein the pressure vessel is longitudinally indented and partially collapsed from an intermediate portion of the pressure vessel to and including its said arcuate end.

4. The device of claim 1 wherein the pressure vessel is formed of a form sustaining, rigid material permanently deformable to its expanded condition wherein its side wall has a generally circular uninterrupted cross section of said increased diameter.

5. The device of claim 1 wherein the operating member is in the form of an elongated pin having a diameter generally equal but slightly less than that of the tubular pressure vessel prior to actuation of the pressure generating device.

References Cited
UNITED STATES PATENTS

| | | | |
|---|---|---|---|
| 2,564,209 | 8/1951 | Murphy | 89—1.01 X |
| 2,575,071 | 11/1951 | Rockwell | 89—1.01 X |
| 2,830,539 | 4/1958 | Cecil, Jr. | 89—1.01 X |
| 3,106,131 | 10/1963 | Barr et al. | 89—1.01 |
| 3,246,602 | 4/1966 | Meredith et al. | 102—24 |
| 3,285,172 | 11/1966 | Foster | 102—24 |
| 3,362,290 | 1/1968 | Carr et al. | 89—1.01 |

SAMUEL W. ENGLE, Primary Examiner

U.S. Cl. X.R.

85—DIG, 65; 102—39